Patented Oct. 12, 1954

2,691,624

UNITED STATES PATENT OFFICE 2,691,624

AZEOTROPIC DISTILLATION OF PROPYL AMINES

Anthony Arthur Leonard Challis, Norton-on-Tees, England, assignor to Imperial Chemical Industries Limited, a corporation of Great Britain No Drawing. Application July 31, 1951, Serial No. 239,626

Claims priority, application Great Britain August 4, 1950

8 Claims. (Cl. 202—42)

This invention relates to the separation of amines.

In certain processes for the production of amines, mixtures comprising primary, secondary and tertiary amines and water may be obtained. A mixture of this type is produced, for example, in the amination of n-propanol. In this process, the mixture, in general, comprises mono-, di- and tri-n-propylamines, n-propanol and water. The mono-n-propylamine may be removed by distillation, but difficulty is encountered in separating the di- and tri-n-propylamines, since these and n-propanol form azeotropes with water, as illustrated in Table 1 below, which gives the boiling points of these substances, and of their azeotropes with water.

TABLE 1

| Substance | B. Pt. ° C. | B. Pt. of azeotrope of substance with water, ° C. |
|---|---|---|
| Di-n-propylamine | 109 | 86.7 |
| Tri-n-propylamine | 156 | 94.3 |
| n-Propanol | 97 | 87.7 |

According to the present invention, there is provided a process for the production of concentrates of di-n-propylamine and/or tri-n-propylamine from a mixture containing these compounds together with water and n-propanol, which comprises the step of subjecting the mixture to fractional distillation in the presence of a hydrocarbon boiling between 75° C. and 85° C., whereby water and n-propanol are removed as constituents of azeotropes formed by the hydrocarbon with either or both of these compounds.

The hydrocarbon for use in the process of the present invention may be cyclohexane, or a paraffin, or a paraffin fraction boiling within the range of 75° to 85° C., but it is preferred to employ benzene.

Thus, in one embodiment of the process, when it is desired to separate di-n-propylamine and/or tri-n-propylamine from an aqueous mixture also containing ammonia, n-propanol and mono-n-propylamine, the mixture is heated to remove substantially all of the ammonia and mono-n-propylamine, and the residue distilled in the presence of a hydrocarbon, as hereinbefore defined, whereby hydrocarbon-water-n-propanol, and hydrocarbon-water or hydrocarbon-n-propanol azeotropes are successively removed. The hydrocarbon - water - n - propanol azeotrope obtained by this method may be separated into a water-rich lower layer, and a hydrocarbon-rich upper layer, the major proportion of n-propanol being contained in the upper layer. The separation is preferably carried out at a temperature in excess of room temperature. In particular, it is advantageous to operate within the range of 40° to 60° C. The lower layer may be removed by decantation, and the upper layer returned to the still. In this way, the mixture may be freed from water. On continued distillation, the hydrocarbon-n-propanol azeotrope may be removed, and then, as successive fractions, residual benzene or n-propanol, di-n-propylamine and tri-n-propylamine.

For example, when using benzene as the hydrocarbon, the initial product is a benzene-n-propanol-water azeotrope, which boils at 68.5° C., and contains 82.4% by weight benzene, 9.0% by weight n-propanol and 8.6% by weight water. This distillate, on standing, separates into two layers, an upper layer rich in benzene and containing substantially all of the n-propanol, and a lower aqueous layer. The lower layer may be removed, and the upper layer recycled to the still. When the water has been removed, the next fraction comprises a benzene-n-propanol azeotrope, boiling at 77.1° C. and containing 83% by weight of benzene. The remaining constituents of the mixture may be separated by a simple fractional distillation.

This method of separation is particularly advantageous when the n-propanol content of the mixture is substantial, for example, when it is above 8% by volume.

According to a further feature of the present invention, there is provided a process for the concentration of di-n-propylamine and/or tri-n-propylamine from an aqueous mixture which may also contain ammonia, n-propanol and mono-n-propylamine, which comprises the steps of heating the mixture to remove substantially all of the ammonia and mono-n-propylamine, removing a portion of the water by allowing the mixture to separate at a temperature of not less than 50° C. into an upper amine-rich layer, and a lower water-rich layer which is removed, and subjecting the upper layer to distillation in the presence of a hydrocarbon boiling at 75° C. to 85° C. whereby water and n-propanol are removed as constituents of azeotropes formed by the hydrocarbon with either or both of these compounds.

This embodiment of the process is advantageous when the n-propanol content of the mixture is insufficient to increase the mutual solubilities of water and the di- and tri-n-propylamines to a detrimental extent; in general the n-propanol content of the mixture should preferably not exceed 8% by weight if this method is to be employed.

For example, in separating di- and tri-n-propylamines from a mixture comprising these together with ammonia, n-propanol, mono-n-propylamine and water, the mixture may be heated to a temperature of 50° C. to 80° C. whereby the ammonia and mono-n-propylamine are removed. A separation of the residual mixture may then be achived by allowing it to stand at a temperature between 50° and 80° C., whereby two layers are obtained, the lower layer containing water with a small proportion of di-n-propylamine, and the upper layer comprising predominantly n-propanol, di-n-propylamine and tri-n-propylamine, together with a small amount of water. This separation may be illustrated by considering a water-di-n-propylamine mixture. At 80° C., the mixture separates into two layers, the upper layer containing 94% by weight of di-n-propylamine, and the lower layer containing 99% by weight of water. At 50° C. the upper layer contains 89% by weight of di-n-propylamine, and the lower layer is substantially free from di-n-propylamine. The presence of n-propanol decreases the efficiency of this separation, and therefore the n-propanol concentration should be kept as low as possible, and preferably below 8% by weight of the mixture.

After the removal of the lower layer, the upper layer comprising predominantly n-propanol, di-n-propylamine and tri-n-propylamine together with a small amount of water, is separated into its constituents by distillation in the presence of a hydrocarbon, as hereinbefore defined. For example, as disclosed above, when benzene is used, a benzene-propanol-water azeotrope boils off at 68.5° C. and a benzene-n-propanol azeotrope at 77.1° C. The remaining constituents of the mixture may be separated by a simple fractional distillation.

The hydrocarbon for use in the process of the present invention may be added either immediately prior to the separation of the mixture into amine-rich and water-rich layers, or it may be added subsequent to this separation. It may be introduced in a pure state, or, for example, in the form of a hydrocarbon-n-propanol azeotrope, recycled from a later stage in the process.

In the examples given below, it is to be understood, unless stated to the contrary, that in the distillations a reflux ratio of 20:1 was employed, and that the analyses are expressed as percentages by volume.

Example 1

5 litres of a liquid having a volume composition:

| | Percent |
|---|---|
| Mono-n-propylamine | 25 |
| Di-n-propylamine | 25 |
| Tri-n-propylamine | 20 |
| n-Propanol | 8 |
| Water | 22 | was fractionally distilled in a column having a performance equivalent to 30 theoretical plates. A fraction having a volume of 1200 mls. was collected at a temperature of 48° C. to 50° C. This fraction was substantially pure mono-n-propylamine, this corresponding to a 96% recovery of the mono-n-propylamine.

On continuing the distillation so that the temperature rose from 50° C. to 80° C. an interfraction having a volume of 40 mls. was collected. The distillation was stopped, and the boiler, after the addition of 400 mls. benzene, was allowed to cool to 60° C. The lower layer having a volume of 998 mls. was removed from the boiler. This layer contained 99.4% water, corresponding to 90% of the initial water content.

The distillation was now continued, and at 68.5° C. to 77° C. a fraction was obtained, which was separated in a decanter maintained at 40° to 50° C. The upper layer was recirculated to the boiler. The lower layer, which had a volume of 101 mls. contained 97% water, this corresponding to 9% of the initial water content. This layer also contained 1.8% di-n-propylamine, 0.4% n-propanol, 0.8% mono-n-propylamine.

The following fractions were obtained on further distillation of the liquid remaining in the boiler:

| Fraction | B. Pt., °C. | Volume ml. | Composition |
|---|---|---|---|
| A | 77–77.5 | 480 | 83% benzene; 16% n-propanol. |
| B | 77.5–106 | 360 | 89% n-propanol; 11% di-n-propylamine. |
| C | 106–110 | 1,204 | Substantially pure di-n-propylamine. |
| D | 110–150 | 15 | |
| E | 150–156 | 804 | 99% tri-n-propylamine. |
| Residue | | 198 | 97% tri-n-propylamine. |

Fraction A was re-used in a subsequent azeotropic distillation; fraction B was added to the feed material in a subsequent n-propanol amination reaction.

Example 2

An n-propanol amination product had a total weight of 2031 lbs. and had the following composition by weight:

| | Percent |
|---|---|
| Mono-n-propylamine | 20.4 |
| Di-n-propylamine | 26.8 |
| Tri-n-propylamine | 15.1 |
| n-Propanol | 8.1 |
| Water | 29.6 |

On distillation up to 80° C. using a column having a performance equivalent to 15 theoretical plates, 408 lbs. of mono-n-propylamine, in 98% purity, were obtained. 250 lbs. of a benzene-n-propanol mixture containing 83% by weight of benzene were added and the distillation continued, the distillate passing over at 67° C. to 68° C., being collected in a decanter maintained at 40° C. The upper layer from the decanter was continuously returned to the boiler. The lower layer was removed, and in this way 608 lbs. of a liquid containing 98.3% by weight of water were removed from the mixture.

On continuing the distillation, the following fractions were obtained:

| Fraction | B. Pt., °C. | Weight, lbs. | Composition by weight |
|---|---|---|---|
| A | 68–80 | 244 | 83% benzene; 14.4% n-propanol; 2.6% di-n-propylamine. |
| B | 80–100 | 175 | 91% n-propanol; 9% di-n-propylamine. |
| C | 100–106 | 40 | 20% n-propanol; 80% di-n-propylamine. |
| D | 106–110 | 480 | Substantially pure di-n-propylamine. |

Of these fractions, fraction A was re-used in later distillations of this type; fractions B and C were added to the feed material for a subsequent n-propanol amination reaction.

The residue was now introduced into a distillation apparatus having a performance equivalent to 40 theoretical plates. At 154° C. to 156° C., 293 lbs. of substantially pure tri-n-propylamine were obtained as distillate.

I claim:

1. A process for separating di-n-propylamine and tri-n-propylamine from a mixture containing di-n-propylamine, tri-n-propylamine, n-propanol and water which comprises adding to said mixture a hydrocarbon selected from the group consisting of cyclohexane and benzene, distilling the resulting mixture, said amines remaining as bottoms, the water being separated therefrom by the formation of the hydrocarbon-water-n-propanol azeotrope, the said azeotrope being then condensed and passed to a decanter wherein it separates into an upper hydrocarbon-rich layer, said upper layer also containing the major amount of n-propanol, and a lower water-rich layer, the lower layer being removed by decantation and the upper layer being returned to the still where distillation in the presence of the hydrocarbon is continued until substantially all water is removed.

2. A process as claimed in claim 1 in which the hydrocarbon is benzene.

3. A process as claimed in claim 1 in which the decanter is maintained at a temperature of 40° to 60° C.

4. A process as claimed in claim 1 in which the said distillation after removal of the water is continued to remove the hydrocarbon and n-propanol after which fractions comprising substantially pure di-n-propylamine and tri-n-propylamine are obtained.

5. In a process of preparing di-n-propylamine and tri-n-propylamine by the amination of n-propanol the steps of separating di-n-propylamine and tri-n-propylamine from the amination mixture containing the di-n-propylamine, tri-n-propylamine, n-propanol and water, said steps comprising adding to said mixture a hydrocarbon selected from the group consisting of cyclohexane and benzene, distilling the resulting mixture, said amines remaining as bottoms, the water being separated therefrom by the formation of the hydrocarbon-water-n-propanol azeotrope, the said azeotrope being then condensed and passed to a decanter wherein it separates into an upper hydrocarbon-rich layer, said upper layer also containing a major amount of the n-propanol, and a lower water-rich layer, the lower layer being removed by decantation and the upper layer being returned to the still where distillation in the presence of the hydrocarbon is continued until substantially all the water is removed, the only water used in the process being that in the aforesaid amination mixture.

6. The process of claim 5 in which the hydrocarbon is benzene.

7. The process of claim 5 in which the decanter is maintained at a temperature of 40° C. or 60° C.

8. The process of claim 5 in which the said distillation after removal of the water is continued to remove the hydrocarbon and n-propanol after which fractions comprising substantially pure di-n-propylamine and tri-n-propylamine are obtained.

References Cited in the file of this patent

UNITED STATES PATENTS

| Number | Name | Date |
| --- | --- | --- |
| 2,232,059 | Farlow | Feb. 18, 1941 |
| 2,512,584 | Smith | June 20, 1950 |
| 2,512,585 | Smith | June 20, 1950 |

OTHER REFERENCES

Horsley: Table of Azeotropic Data, reprinted from Analytical Chemistry, vol. 19, pages 508–609, August 1947; page 587 relied on.

Journal of the American Chemical Society, vol. 63, August 1951, pages 2094–2095.